(12) United States Patent
Joynes et al.

(10) Patent No.: US 9,005,025 B2
(45) Date of Patent: Apr. 14, 2015

(54) GAME CONTROLLER

(75) Inventors: Matthew Joynes, Agoura Hills, CA (US); James Bower, Windermere, FL (US)

(73) Assignee: Wikipad, Inc., Westlake Village, CA (US)

( * ) Notice: Subject to any disclaimer, the term of this patent is extended or adjusted under 35 U.S.C. 154(b) by 507 days.

(21) Appl. No.: 13/363,021

(22) Filed: Jan. 31, 2012

(65) Prior Publication Data

US 2013/0157764 A1 Jun. 20, 2013

Related U.S. Application Data

(60) Provisional application No. 61/577,709, filed on Dec. 20, 2011.

(51) Int. Cl.
| | | |
|---|---|---|
| *A63F 13/06* | (2006.01) | |
| *A63F 13/08* | (2006.01) | |
| *A63F 13/20* | (2014.01) | |
| *A63F 13/90* | (2014.01) | |

(52) U.S. Cl.
CPC ............... *A63F 13/06* (2013.01); *A63F 13/08* (2013.01); *A63F 2300/1043* (2013.01); *A63F 2300/204* (2013.01)

(58) Field of Classification Search
CPC . A63F 13/06; A63F 13/08; A63F 2300/1043; A63F 2300/204
USPC .......... 463/36–38, 46, 47; 700/85; 348/211.7; 345/161; 710/303, 304
See application file for complete search history.

(56) References Cited

U.S. PATENT DOCUMENTS

| | | | |
|---|---|---|---|
| 4,469,330 A * | 9/1984 | Asher | 463/38 |
| 5,207,426 A * | 5/1993 | Inoue et al. | 463/36 |
| 6,157,958 A * | 12/2000 | Armitage et al. | 709/250 |
| 6,213,879 B1 * | 4/2001 | Niizuma et al. | 463/36 |
| 6,402,620 B1 * | 6/2002 | Naghi | 463/47 |
| 6,530,838 B2 * | 3/2003 | Ha et al. | 463/36 |
| 7,580,728 B2 * | 8/2009 | Vance et al. | 455/556.1 |
| 7,653,771 B2 * | 1/2010 | Liberty | 710/303 |
| 7,833,097 B1 * | 11/2010 | Maddox et al. | 463/36 |
| 8,226,459 B2 * | 7/2012 | Barrett et al. | 463/7 |
| 8,360,883 B2 * | 1/2013 | Goto et al. | 463/38 |
| 8,550,915 B2 * | 10/2013 | Ashida et al. | 463/37 |
| 8,710,381 B2 * | 4/2014 | Hsu et al. | 200/5 A |
| 2005/0269769 A1 * | 12/2005 | Naghi et al. | 273/148 B |
| 2008/0261695 A1 * | 10/2008 | Coe | 463/37 |
| 2010/0202627 A1 * | 8/2010 | Gray | 381/77 |
| 2011/0195785 A1 * | 8/2011 | Ashida et al. | 463/37 |
| 2013/0053146 A1 * | 2/2013 | Ikeda et al. | 463/37 |

* cited by examiner

*Primary Examiner* — David L Lewis
*Assistant Examiner* — Matthew D Hoel
(74) *Attorney, Agent, or Firm* — Hall Estill Attorneys at Law; Daniel P. Dooley

(57) ABSTRACT

A game controller comprises a top casing, a bottom casing, a circuitry board, and a plurality of rechargeable batteries. The top casing comprises different type of control components, at least two speakers and a plurality of solar panel. The bottom casing comprises a locking mechanism, plurality of trigger buttons, headphone jack and a USB port. A handheld device can be inserted into the present invention and secured from the locking mechanism. The handheld device can be connected to the present invention wirelessly with a control application or a USB data cable can be used. The different type of control buttons and the trigger buttons controls the input commands of the present invention.

20 Claims, 7 Drawing Sheets

GAME CONTROLLER

The current application claims a priority to the U.S. Provisional Patent application Ser. No. 61/577,709 filed on Dec. 20, 2011.

FIELD OF THE INVENTION

The present invention generally relates to a portable handheld tablet game controller which is able to wirelessly connect with variety of different handheld tablets. More specifically, the present invention is an apparatus that allows a user to control a playable character, object, and/or provide input in a computer game to a tablet computer.

BACKGROUND OF THE INVENTION

Handheld tablet computers such as iPads have become very popular in mainstream population. The handheld tablets provide a way for people to do various tasks such as web surfing, writing emails, and even playing games. Video games are amongst the most popular activity for people to do. However, playing video games typically require a precise controller to allow a user to accurately input a command. Currently, there are no built in controller for the handheld tablet computers that provides accurate and precise feedback to the user while being ergonomic and comfortable. It is therefore an object of the present invention to introduce an apparatus that allows a user to comfortably control a playable character, object, and/or provide input into a computer game in the handheld tablet computers.

Many of the present handheld tablet gaming control devices available are limited to a certain types of games or their functionality is limited due to their component configuration. Moreover, most of the gaming control devices are limited to a certain brands. The present invention implements a system which is able to connect with different types and brands of handheld tablets. The present invention is not limited to a certain type of games which makes the present invention a universal controller. The present invention comprises a control application which can be downloaded into the handheld tablets. The control application allows a simple wireless connection between the handheld devices and the present invention. The present invention also can be connected to the handheld tablets from a USB connection.

DETAIL DESCRIPTIONS OF THE INVENTION

All illustrations of the drawings are for the purpose of describing selected versions of the present invention and are not intended to limit the scope of the present invention.

Figure 1:
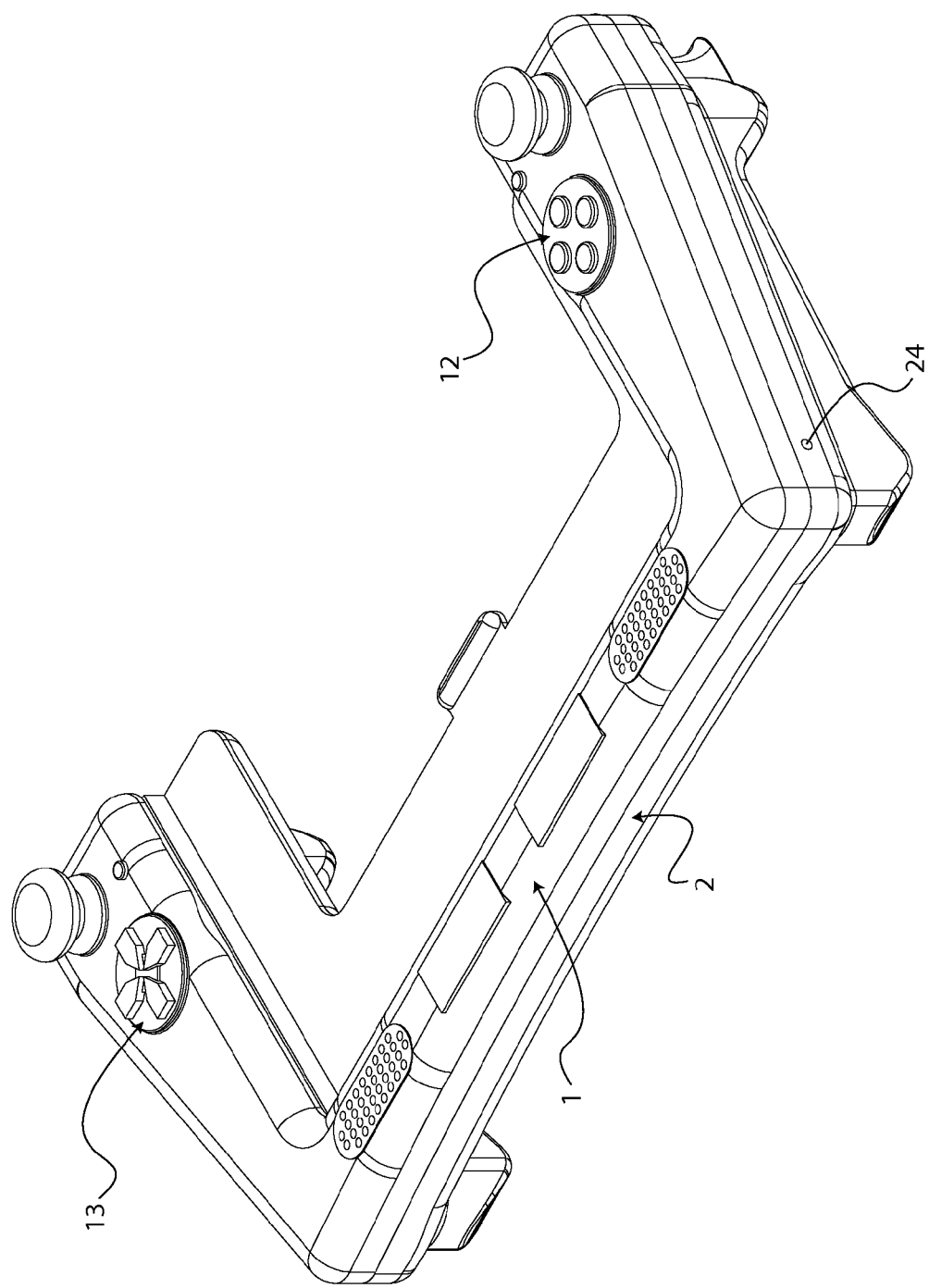
FIG. 1 is a perspective view of the present invention.
Figure 2:
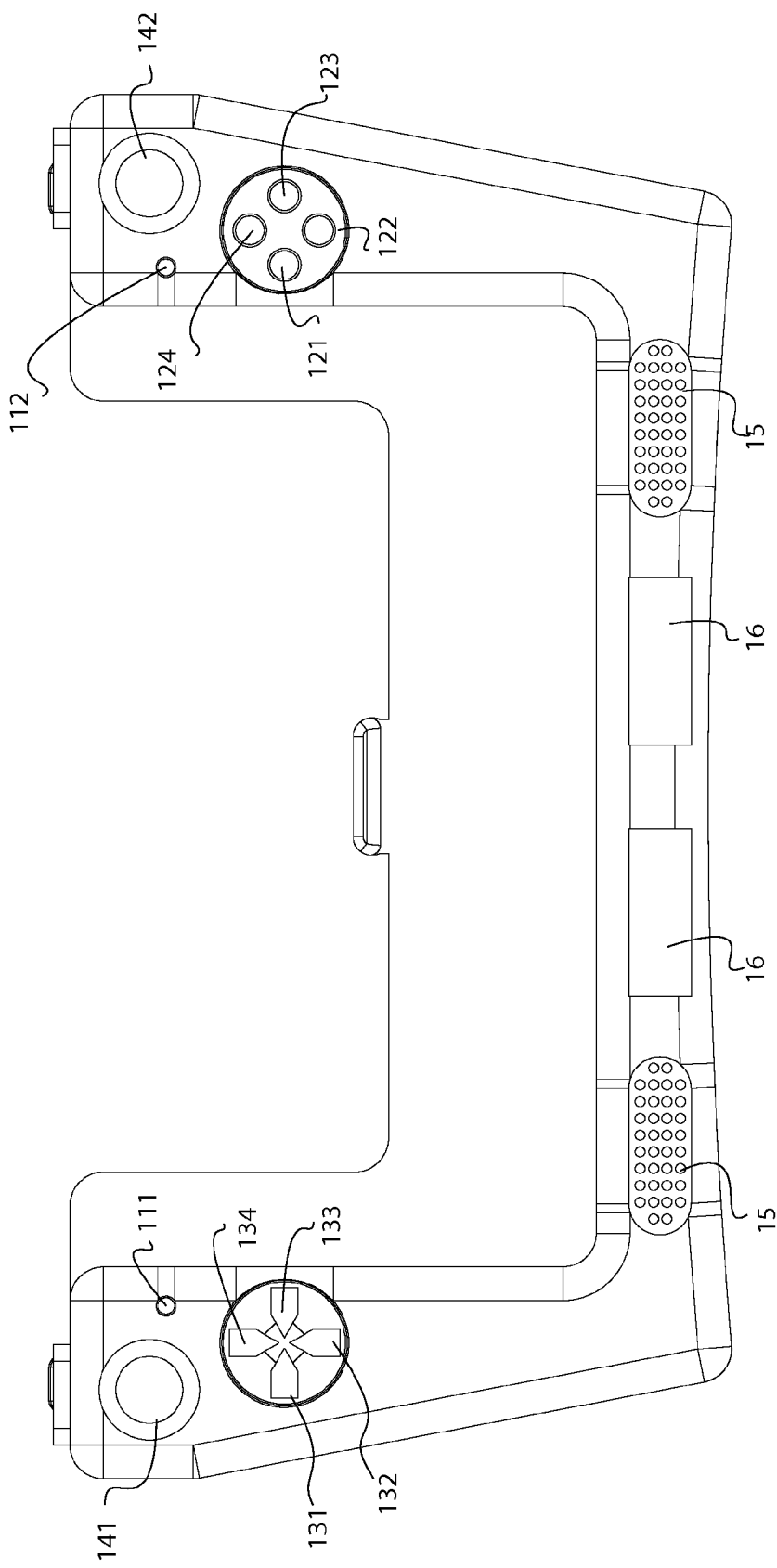
FIG. 2 is a top view of the present invention.
Figure 3:
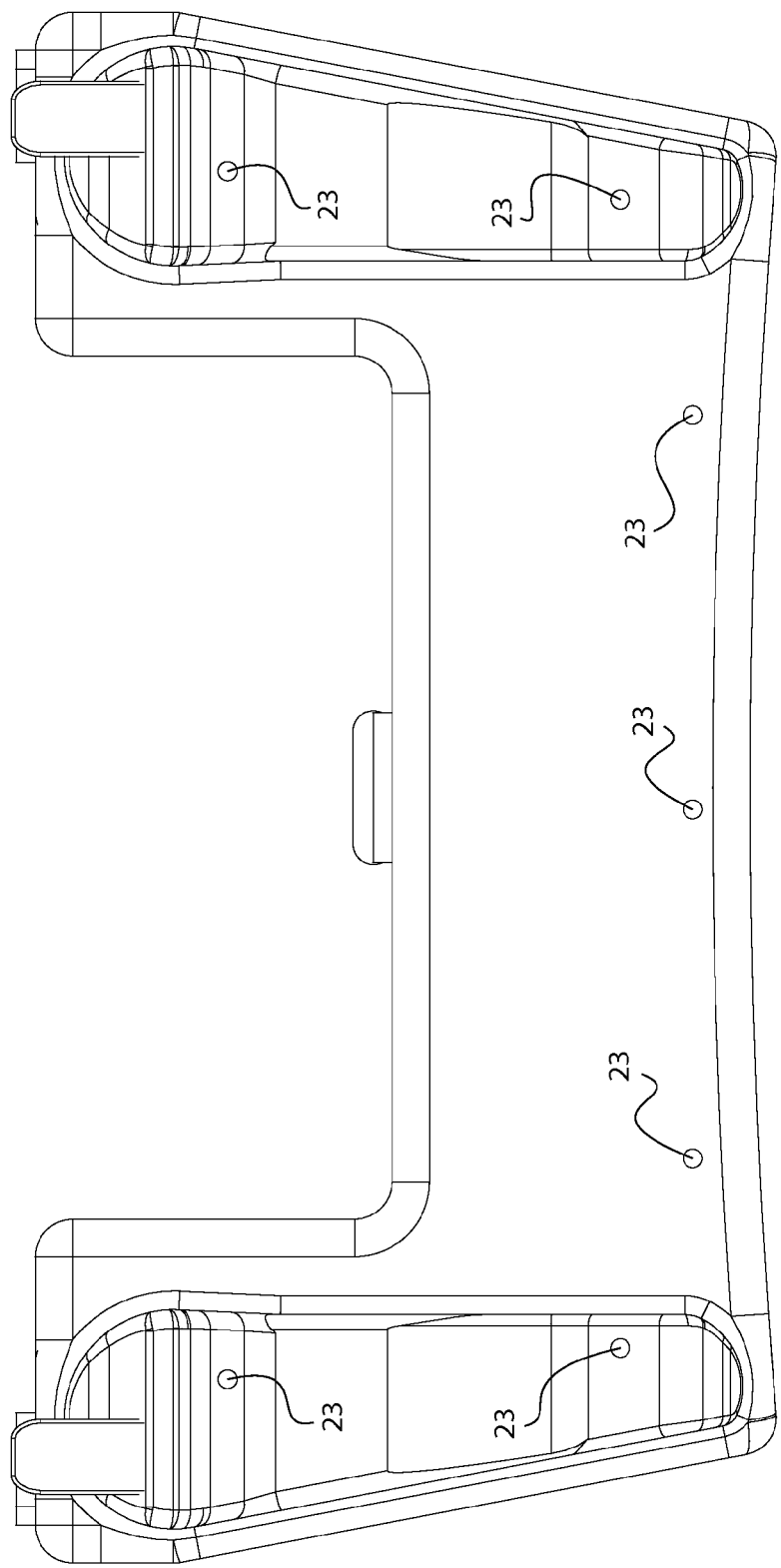
FIG. 3 is a bottom view of the present invention.
Figure 4:
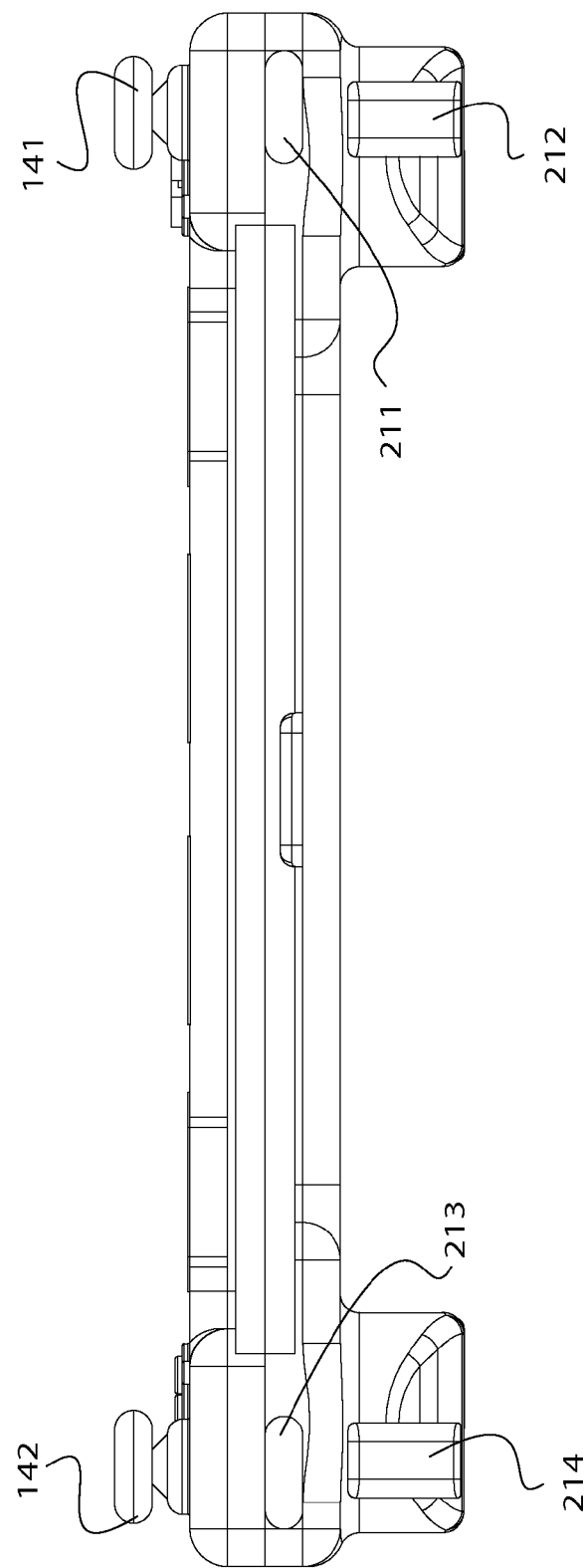
FIG. 4 is a front view of the present invention.
Figure 5:
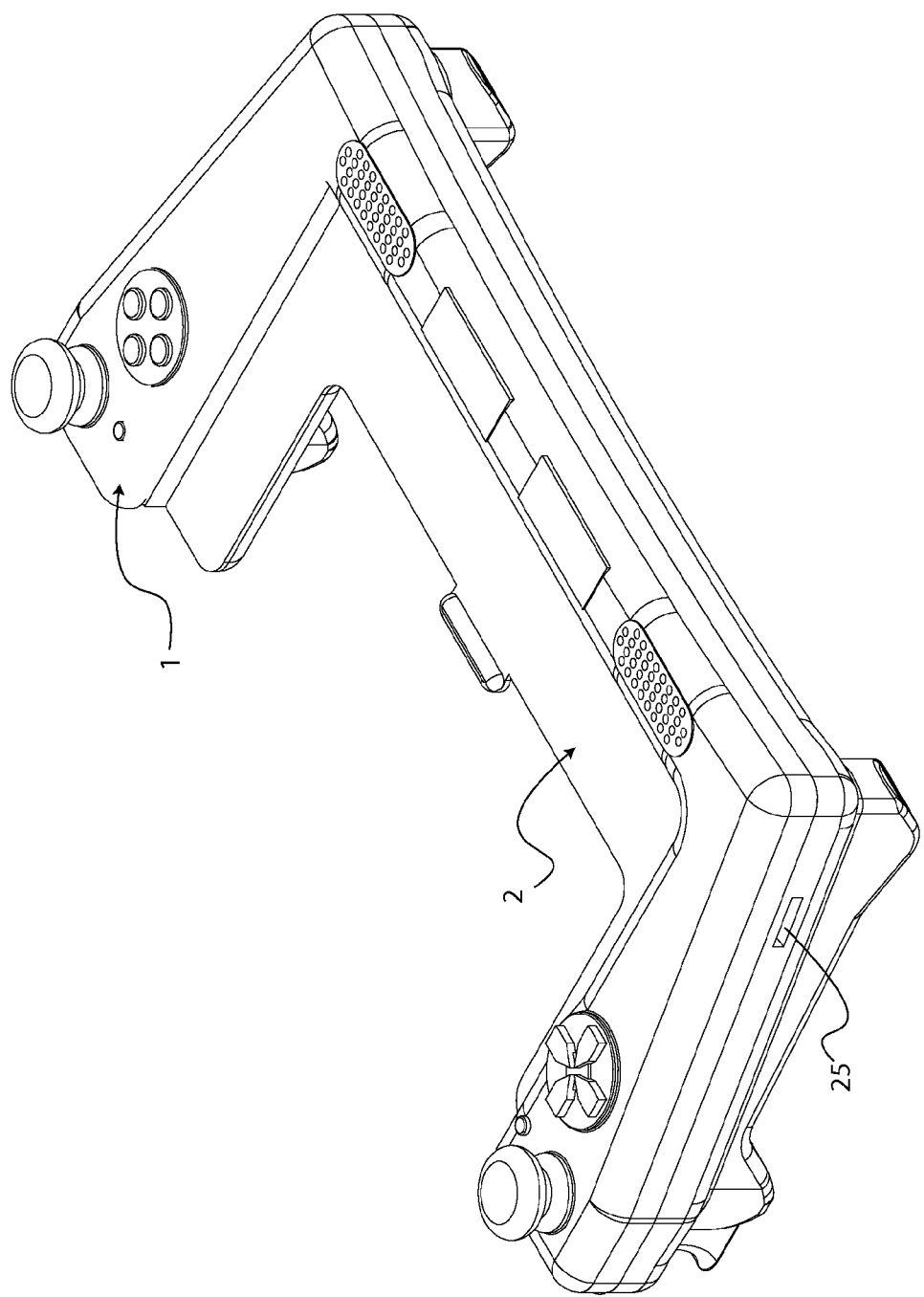
FIG. 5 is a left perspective view of the present invention.
Figure 6:
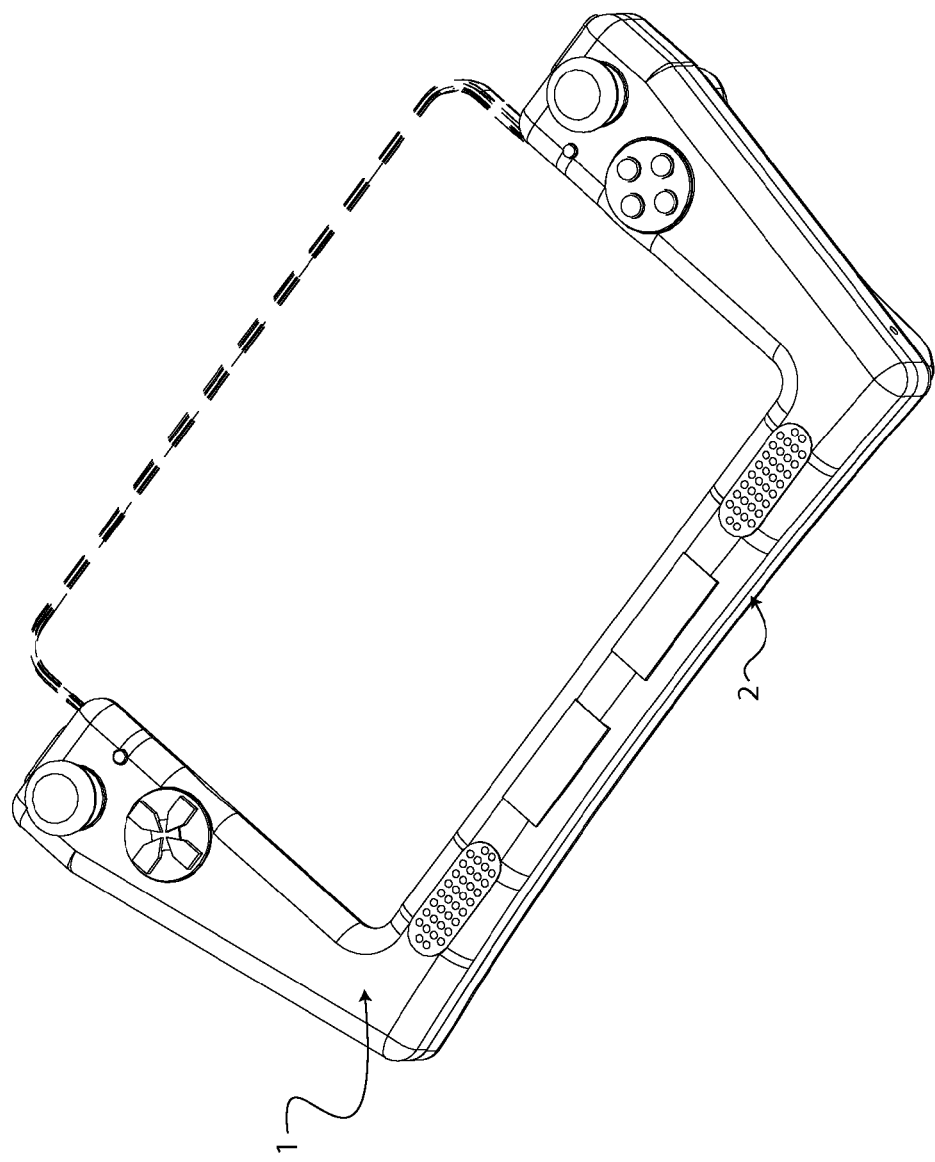
FIG. 6 is a perspective view of the present invention with an inserted handheld tablet.
Figure 7:
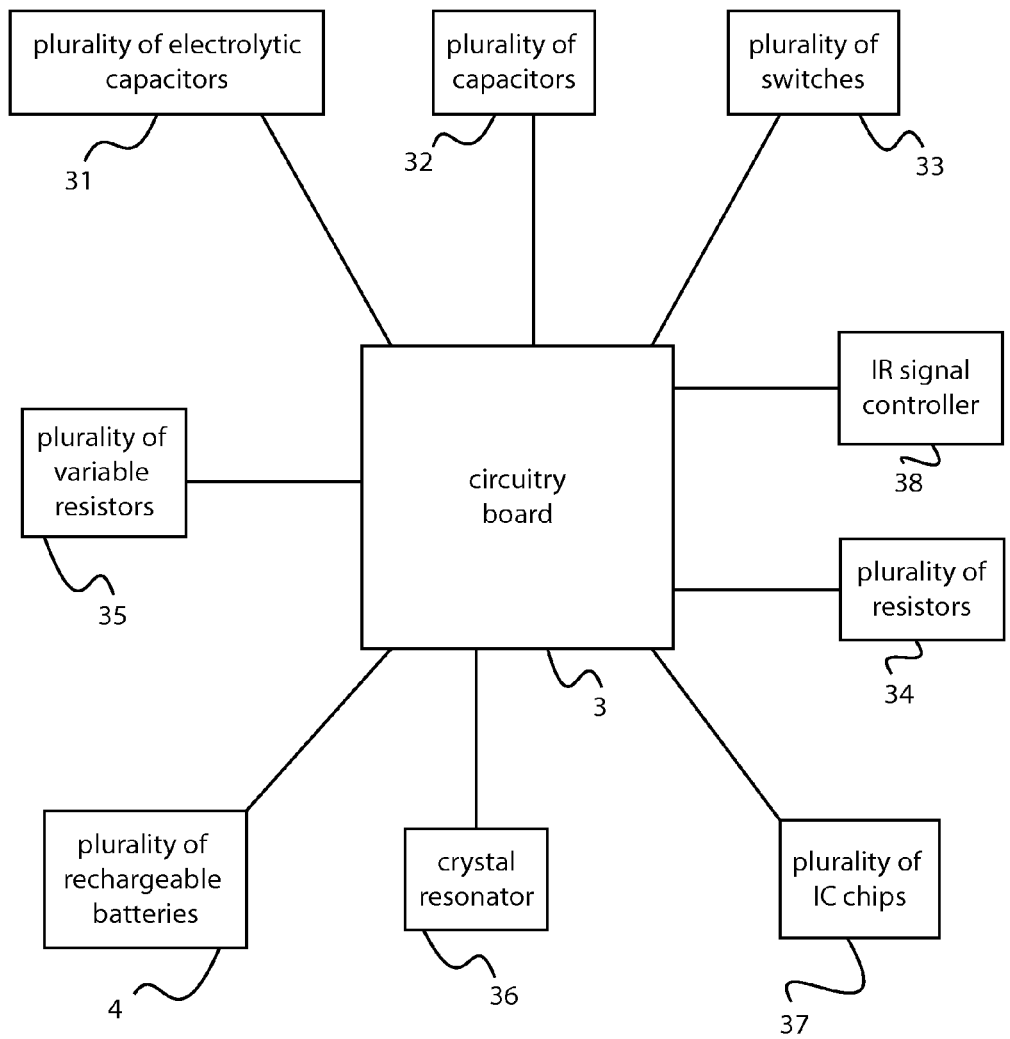
FIG. 7 is a system view of the circuitry system positioned inside the present invention.

The present invention, a Game Controller, comprises a top casing 1, a bottom casing 2, a circuitry board 3, and a plurality of rechargeable batteries 4. The circuitry board 3 and the plurality of rechargeable batteries 4 are positioned inside the bottom casing 2. The top casing 1 is connected to the bottom casing 2. The plurality of rechargeable batteries 4 is the primary power source of the present invention. The plurality of rechargeable batteries 4 is electronically connected to the circuitry board 3. The plurality of rechargeable batteries 4 is charged by an external power cord which is connected between a power outlet and the present invention. The top casing 1 is designed as a shell and has an elongated "U" shape design. The top easing 1 has a left vertical section, a right vertical section, and a horizontal section. The top casing 1 is made out of high strength plastic so the weight of the top casing 1 can be minimized, the bottom easing being connected to the top casing from below. The top and bottom casings, 1 and 2, are joined to form not more than a three sided open U-shaped structure with an absence of structure between the vertical portions of the U-shaped structure. This structure accommodates a handheld tablet that nests therein, as shown by FIG. 6, such that the handheld tablet is confined by the open U-shaped three sided structure.

The plurality of menu buttons 11 comprises a select button 111 and a start button 112. The select button 111 is positioned at the left vertical section of the top casing 1 adjacent to the at least two joysticks 14. The start button 112 is positioned at the right vertical section of the top casing 1 adjacent to the at least two joysticks 14. Both select button 111 and the start button 112 have a circular shape design. The select button 111 has the word "SELECT" written on top and similarly the start button 112 ahs the word "START" written on top. The plurality of menu buttons 11 is electronically connected to the circuitry board 3. The main functionality of the select button 111 to selects certain functions within the present invention. For an example, correct applications or certain features within an application can be selected from the select button 111. The start button 112 is the designated starting button on any kind of application. For an example, many gaming application has a starting point and the start button 112 can be easily used as the input command for the starting point. The plurality of menu buttons 11 is made out of materials that are capable of withstanding the constant movements of the plurality of menu buttons 11. These materials can be high strength plastic or metal.

The plurality of control buttons 12 are positioned below the start button 112 and connected to the right vertical section of the top casing 1. The plurality of control buttons 12 comprises a left button 121, a bottom button 122, a right button 123, and a top button 124. The plurality of control buttons 12 are positioned ninety degrees apart from each other and have a circular shape design. The left button 121 has the letter "X" displayed on top and the left button 121 is tinted in blue color. The bottom button 122 has the letter "A" displayed on top and the bottom button 122 is tinted in green color. The right button 123 has the letter "B" displayed on the top and the right button 123 is tinted in red color.

The top button 124 has the letter "Y" displayed on top and the top button 124 is tinted in yellow color. The plurality of control buttons 12 is designed with the above symbolic letters and colors for straightforward directional purposes and aesthetically pleasing looks respectively. For an example, in an instruction section, the plurality of control buttons 12 can be identify as the "A" or "Y" which result into less complication and easy operation.

The plurality of control buttons 12 is electronically connected to the circuitry board 3. The plurality of control buttons 12 is used to control different functionalities within a given application. For an example, a fighting game application have many different features like upper kick, lower kick, upper punch, and lower punch. Each one of these features can be assigned into each button in the plurality of control buttons 12. The plurality of control buttons 12 is made out of materials like high strength plastic or metal that is capable of withstanding the constant movements of the plurality of control buttons 12.

The directional pad 13 is positioned below the select button 111 and connected to the left vertical section of the top casing 1. The directional pad 13 comprises a right arrow button 131, a top arrow button 132, a left arrow button 133, and a bottom arrow button 134. Each of the buttons in the directional pad 13 is designed into an arrow shape. The arrow shape is a combination of a square and an equilateral triangle. The equilateral triangle part of the each button is pointed inward and each button is positioned ninety degrees apart. The right arrow button 131 has a symbol of an arrow pointed towards the plurality of control buttons 12. The top arrow button 132 has a symbol of an arrow pointed upward. The left arrow button 133 has a symbol of an arrow pointed towards the right arrow button 131. The bottom arrow button 134 has a symbol of an arrow pointed downward. The directional pad 13 is electronically connected to the circuitry board 3. The main functionality of the directional pad 13 is to select the correct input by moving up and down or left and right. For an example, if there is a list of input commands, the bottom arrow button 134 can be used to move downward within the list. The directional pad 13 also performs as the volume controller in the present invention. The volume control function can be selected from the select button 111. Then the volume is increased or decreased with the use of the directional pad 13. The directional pad 13 is made out of materials like high strength plastic or metal that is capable of withstanding the constant movements of the each button.

The at least two joysticks 14 are positioned on the top casing 1. The at least two joysticks 14 comprises a first joystick 141 and a second joystick 142. The first joystick 141 is connected to the left vertical section of the top casing 1 and above from the directional pad 13. Similarly the second joystick 142 is connected to the right vertical section of the top casing 1 and above from the plurality of control buttons 12. The first joystick 141 and the second joystick 142 have a cylindrical shape design which allows the first joystick 141 and the second joystick 142 to rotate in a complete circular manner. The at least two joysticks 14 are electronically connected to the circuitry board 3. The at least two joysticks 14 are mainly used in gaming applications. The at least two joysticks 14 have the same functionality as the plurality of control buttons 12 and the directional pad 13 but some of the advance gaming applications requires the at least two joysticks 14 to be independent from as the plurality of control buttons 12 and the directional pad 13. The at least two joysticks 14 are made out of high strength plastic or metal in order to compensate the constant movements.

The at least two speakers 15 are connected to the horizontal section of the top casing 1. The at least two speakers 15 amplify the volume from the device been used in the present invention. The at least two speakers 15 are electronically connected to the circuitry board 3. The plurality of solar panels 16 is positioned between the at least two speakers 15 and connected to the horizontal section of the top casing 1. The plurality of solar panels 16 is electronically connected to the plurality of rechargeable batteries 4. The plurality of solar panels 16 functions as the secondary power source to the present invention. The plurality of solar panels 16 constantly recharges the plurality of rechargeable batteries 4 as the power level decreases.

The bottom casing 2 is designed as a shell and has an elongated "U" shape design similar to the top casing 1. The bottom casing 2 has a left vertical segment, a right vertical segment, and a horizontal segment. The left vertical segment and the right vertical segment have a unique design which fits firmly to the user's palms. This unique design provides secure connection to the present invention when the present invention is held by its users. The bottom casing 2 is made out of high strength plastic so the weight of the bottom casing 2 is minimized. The left vertical segment and the right vertical segment can be combined with a small rubber stripes to provide additional friction. The bottom casing 2 may be connected with a stand. The stand is connected to the back side of the bottom casing 2 so the present invention can be stored upright. The stand is positioned parallel to the bottom casing 2 to prevent any obstructions that the users might have while the present invention is being used. The stand can be extended out from the bottom casing 2 so the present invention can be placed on a surface. The color of the bottom casing 2 can be either white or black but not limited to white or black. The bottom casing 2 comprises a plurality of trigger buttons 21, a plurality of screw holes 23, a headphone jack 24, and a universal serial bus port (USB port) 25.

The plurality of trigger buttons 21 comprises a top left button 211, a bottom left button 212, a top right button 213, and a bottom right button 214. The top left button 211 is positioned towards the upper part of the left vertical segment in the bottom casing 2. The bottom left button 212 is positioned below the top left button 211. The top right button 213 is positioned towards the upper part of the right vertical segment in the bottom casing 2. The bottom right button 214 is positioned below the top right button 213. Both top left buttons 211 and the top right button 213 have a flat top surface. Both bottom left button 212 and the bottom right button 214 have a curved top surface. Both the flat surface and the curve surface are designed in a way, so the users are able to fully interact with the plurality of trigger buttons 21. The plurality of trigger buttons 21 is made out high strength plastic and electronically connected to the circuitry board 3. The plurality of screw holes 23 is positioned in the bottom casing. The plurality of screw holes is aligned with the top casing 1 so the bottom casing 2 can be securely connected. Plurality of small screws is threaded into the plurality of screw hole 23 which connects with the top casing 2. The headphone jack 24 and the universal serial bus port (USB port) 25 are laterally positioned around the bottom casing 2. An external headphone set can be used when the external headphone set is inserted into the headphone jack 24. The universal serial bus port (USB port) 25 connects to an external UBS power cord. The external USB power cord which is connected to an electric outlet recharges the plurality of rechargeable batteries 4. The headphone jack 24 and the universal serial bus port (USB port) 25 are electronically connected to the circuitry board 3. The universal serial bus port (USB port) 25 opens up a connection port from the present invention to the handheld device therefore the present invention can be connected via the universal serial bus port (USB port) 25. The present invention also comprises a control application which can be downloaded into the handheld devices. The control application connects the present invention and the handheld devices with a simple wireless connection. Users of the present invention have two connecting options with handheld devices and users can choose either one of those connections upon their preference.

The circuitry board 3 connected all of the input and the output data of the present invention. The circuitry board 3 comprises a plurality of electrolytic capacitors 31, a plurality of capacitors 32, a plurality of switches 33, a plurality of resistors 34, a plurality of variable resistors 35, a crystal resonator 36, a plurality of IC chips 37 and a IR signal controller 38. The plurality of electrolytic capacitors 31 is electronically connected to the plurality of capacitors 32 and the plurality of resistors 34. The crystal resonator 36 is electronically connected to the plurality of capacitors 32. The crystal resonator 36, the plurality of resistors 34, and the plurality of variable resistors 35 are electronically connected to the plurality of IC chips 37. The plurality of IC chips 37 and the plurality of switches 33 are electronically connected to the circuitry board 3. The IR signal controller 38 is electronically connected to the circuitry board 3 which provides an IR signal for any kind of wireless connection.

Although the invention has been explained in relation to its preferred embodiment, it is to be understood that many other possible modifications and variations can be made without departing from the spirit and scope of the invention as hereinafter claimed.

What is claimed is:

1. A Game Controller comprises,
a top casing;
a bottom casing;
a circuitry board;
a plurality of rechargeable batteries;
the top casing comprises a plurality of menu buttons, a plurality of control buttons, a directional pad, at least two joysticks, at least two speakers;
the bottom casing comprises a plurality of trigger buttons, a plurality of screw holes, a headphone jack, and a universal serial bus port (USB port);
the plurality of screw holes being aligned with the top casing; and
the bottom casing being connected to the top casing from below, the top and bottom casings joined to form not more than a three sided open U-shaped structure with an absence of structure between the vertical portions of the U-shaped structure in which a handheld tablet nests, such that the handheld tablet is confined by the open U-shaped three sided structure.

2. The Game Controller as claimed in claim 1 comprises,
the circuitry board being positioned inside the bottom casing;
the plurality of rechargeable batteries being positioned inside the bottom casing; and
the circuitry board being electronically connected to the plurality of rechargeable batteries.

3. The Game Controller as claimed in claim 1 comprises,
the plurality of menu buttons comprises a select button and a start button;
the select button being positioned on the top casing from an end;
the start button being oppositely positioned on the top easing from the select button;
the plurality of control buttons being positioned on the top casing below the start button; and
the directional pad being positioned on the top casing opposite from the plurality of control buttons.

4. The Game Controller as claimed in claim 3 comprises,
the select button being electronically connected to the circuitry board;
the start button being electronically connected to the circuitry board;
the plurality of control buttons being electronically connected to the circuitry board; and
the directional pad being electronically connected to the circuitry board.

5. The Game Controller as claimed in claim l comprises,
the at least two joysticks comprises a first joystick and a second joystick;
the first joystick being positioned on the top casing, above from the directional pad;
the second joystick being positioned on the top casing above from the plurality of control buttons;
the at least two speakers being positioned on the top casing below the directional and the plurality of control buttons; and
the plurality solar panels being positioned on the top casing adjacent the at least two speakers.

6. The Game Controller as claimed in claim 5 comprises,
the first joystick being electronically connected to the circuitry board;
the second joystick being electronically connected to the circuitry board;
the at least two speakers being electronically connected to the circuitry board; and
the plurality of solar panels being electronically connected to the circuitry board.

7. The Game Controller as claimed in claim 1 comprises,
the plurality of trigger buttons comprise a top left button, a bottom left button, a top right button, and a bottom right button;
the top left button and the bottom left button being positioned in the bottom casing perpendicular to the first joystick; and
the top right button and the bottom right button being oppositely positioned from the top left button and the bottom left button;
the headphone jack and the universal serial bus port (USB port) being laterally positioned around the bottom casing; and
the headphone jack and the universal serial bus port (USB port) being electronically connected to the circuitry board.

8. The Game Controller as claimed in claim l comprises,
the circuitry board comprises a plurality of electrolytic capacitors, a plurality of capacitors, a plurality of switches, a plurality of resistors, a plurality of variable resistors, a crystal resonator, a plurality of IC chips, and a IR signal controller;
the plurality of electrolytic capacitors being electronically connected to the plurality of capacitors and the plurality of resistors;
the crystal resonator being electronically connected to the plurality of capacitors;
the crystal resonator and the plurality of resistors being electronically connected to the plurality of IC chips;
the plurality of variable resistors being electronically connected to the plurality of IC chips;
the plurality of switches being electronically connected to the circuitry board;
the plurality of IC chips being electronically connected to the circuitry board; and
the IR signal controller being electronically connected to the circuitry board.

9. A Game Controller comprises,
a top casing;
a bottom casing;
a circuitry board;
a plurality of rechargeable batteries;
the top casing comprises a plurality of menu buttons, a plurality of control buttons, a directional pad, at least two joysticks, at least two speakers, and a plurality of solar panels;
the bottom casing comprises a plurality of trigger buttons, a plurality of screw holes, a headphone jack, and a universal serial bus port (USB port);

the plurality of screw holes being aligned with the top casing;

the bottom casing, being connected to the top casing from below, the top and bottom casings joined to tort not more than a three sided open U-shaped structure with an absence of structure between the vertical portions of the U-shaped structure in which a handheld tablet nests, such that the handheld tablet is confined by the open U-shaped three sided structure;

the circuitry board being positioned inside the bottom casing;

the plurality of rechargeable batteries being positioned inside the bottom casing; and the circuitry board being electronically connected to the plurality of rechargeable batteries.

10. The Game Controller as claimed in claim 9 comprises, the plurality of menu buttons comprises a select button and a start button;

the select button being positioned on the top casing from an end;

the start button being oppositely positioned on the top casing from the select, button;

the plurality of control buttons being positioned on the top casing below the start button; and the directional pad being positioned on the top casing opposite from the plurality of control buttons.

11. The Game Controller as claimed in claim 10 comprises, the select button being electronically connected to the circuitry board;

the start button being electronically connected to the circuitry board;

the plurality of control buttons being electronically connected to the circuitry board; and the directional pad being electronically connected to the circuitry board.

12. The Game Controller as claimed in claim 9 comprises, the at least two joysticks comprises as first joystick and a second joystick;

the first joystick being positioned on the top casing above from the directional pad;

the second joystick being positioned on the top casing above from the plurality of control buttons;

the at least two speakers being positioned on the top casing below the directional pad and the plurality of control buttons; and the plurality of solar panels being positioned on the Lop casing adjacent to the at least two speakers.

13. The Game Controller as claimed in claim 12 comprises, the first joystick being electronically connected to the circuitry board;

the second joystick being electronically connected to the circuitry board;

the at least two speakers being electronically connected to the circuitry board; and the plurality of solar panels being electronically connected to the circuitry board.

14. The Game Controller as claimed in claim 12 comprises, the plurality of trigger buttons comprise a top left button, a bottom left button, a top right button, and a bottom right button;

the top left button and the bottom left button being positioned in the bottom casing perpendicular to the first joystick; and the top right button and the bottom right button being oppositely positioned from the top left button and the bottom left button;

the headphone jack and the universal serial bus port USB port) being laterally positioned around the bottom casing; and the headphone jack and the universal serial bus port (USB port) being electronically connected to the circuitry board.

15. The Game Controller as claimed in claim 12 comprises, the circuitry board comprises a plurality of electrolytic capacitors, a plurality of capacitors, a plurality of switches, a plurality of resistors, a plurality of variable resistors, a crystal resonator, a plurality of IC chips, and a IR signal controller;

the plurality of electrolytic capacitors being electronically connected to the plurality of capacitors and the plurality of resistors;

the crystal resonator being electronically connected to the plurality of capacitors;

the crystal resonator and the plurality of resistors being electronically connected to the plurality of IC chips;

the plurality of variable resistors being electronically connected to the plurality of IC chips;

the plurality of switches being electronically connected to the circuitry board;

the plurality of IC chips being electronically connected to the circuitry board; and the IR signal controller being electronically connected to the circuitry board.

16. A Game Controller comprises, a top casing;

a bottom casing;

a circuitry board;

a plurality of rechargeable batteries;

the top casing comprises a plurality of menu buttons, a plurality of control buttons, a directional pad, at least two joysticks, at least two speakers;

the bottom casing comprises a plurality of trigger buttons, a plurality of screw holes, a headphone jack, and a universal serial bus port (USB port);

the plurality of screw holes being aligned with the top casing;

the bottom casing being connected to the top casing from below, the top and bottom casings joined to form not more than a three sided open U-shaped structure with an absence of structure between the vertical portions of the U-shaped structure in which a handheld tablet nests, such that the handheld tablet is confined by the open U-shaped three sided structure;

the circuitry board being positioned inside the bottom casing;

the plurality of rechargeable batteries being positioned inside the bottom casing; and the circuitry board being electronically connected to the plurality of rechargeable batteries.

17. The Game Controller as claimed in claim 16 comprises, the plurality of menu buttons comprises a select button and a start button;

the select button being positioned on the top casing from an end;

the start button being oppositely positioned on the top casing from the select button;

the plurality of control buttons being positioned on the top casing below the start button;

the directional pad being positioned on the top casing opposite from the plurality of control buttons;

the select button being electronically connected to the circuitry board;

the start button being electronically connected to the circuitry board;
the plurality of control buttons being electronically connected to the circuitry board; and
the directional pad being electronically connected to the circuitry board.

18. The Game Controller as claimed in claim 16 comprises,
the at least two joysticks comprises as first joystick and a second joystick;
the first joystick being positioned on the top casing above from the directional pad;
the second joystick being positioned on the top casing above from the plurality of control buttons;
the at least two speakers being positioned on the top casing below the directional pad and the plurality of control buttons;
the plurality of solar panels being positioned on the top casing adjacent to the at least two speakers;
the first joystick being electronically connected to the circuitry board;
the second joystick being electronically connected to the circuitry board;
the at least two speakers being electronically connected to the circuitry board; and
the plurality of solar panels being electronically connected to the circuitry board.

19. The Game Controller as claimed in claim 16 comprises,
the plurality of trigger buttons comprise a top left button, a bottom left button, as top right button, and a bottom right button;
the top left button and the bottom left button being positioned in the bottom casing perpendicular to the first joystick; and
the top right button and the bottom right button being oppositely positioned from the top left button and the bottom left button;
the headphone jack and the universal serial bus port (USB port) being laterally positioned around the bottom casing; and
the headphone jack and the universal serial bus port (USB port) being electronically connected to the circuitry board.

20. The Game Controller as claimed in claim 16 comprises,
the circuitry board comprises a plurality of electrolytic capacitors, a plurality of capacitors, a plurality of switches, a plurality of resistors, a plurality of variable resistors, a crystal resonator, a plurality of IC chips, and a IR signal controller;
the plurality of electrolytic capacitors being electronically connected to the plurality of capacitors and the plurality of resistors;
the crystal resonator being electronically connected to the plurality of capacitors;
the crystal resonator and the plurality of resistors being electronically connected to the plurality of IC chips;
the plurality of variable resistors being electronically connected to the plurality of IC chips;
the plurality of switches being electronically connected to the circuitry board;
the plurality of IC chips being electronically connected to the circuitry board; and
the IR signal controller being electronically connected to the circuitry board.

\* \* \* \* \*